Dec. 24, 1940.  F. T. CHRISTIAN  2,225,610
HOSE COUPLING
Filed Jan. 3, 1938

Spring disc with impervious coating

Witness:
Burr W. Jones

INVENTOR.
Frank T. Christian
BY Clinton A. Janes
ATTORNEY.

Patented Dec. 24, 1940

2,225,610

UNITED STATES PATENT OFFICE 2,225,610

HOSE COUPLING

Frank T. Christian, Elmira, N. Y., assignor, by mesne assignments, to Bendix Aviation Corporation, South Bend, Ind., a corporation of Delaware Application January 3, 1938, Serial No. 183,039

1 Claim. (Cl. 285—169)

The present invention relates to hose couplings and more particularly to quick detachable self-sealing couplings especially adapted for use with solvent or corrosive fluids.

In couplings of the type indicated, it is customary to seal the joint between the parts of the coupling by means of a thimble or washer of resiliently deformable material such as rubber or the like. When solvent or corrosive fluids are being handled, however, there is a tendency for such sealing element to deteriorate by swelling, deforming and losing its resiliency so as to impair the operation of the coupling.

It is an object of the present invention to provide a novel hose coupling incorporating a sealing member which will retain its effectiveness over long periods of use under adverse conditions.

It is another object to provide such a device in which the sealing member is of composite or reenforced construction.

It is a further object to provide such a device in which the sealing member comprises a base or frame of elastic material such as spring metal, coated with a flexible sealing compound such as rubber or the like.

Further objects and advantages will be apparent from the following description taken in connection with the accompanying drawing in which.

Figure 1:
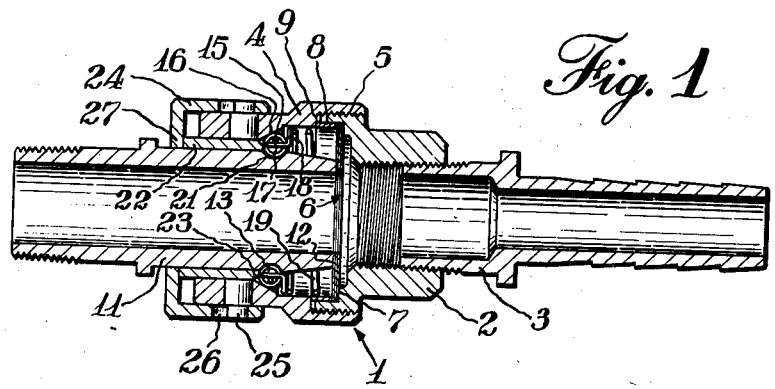
Fig. 1 is a longitudinal substantially mid-sectional view of a coupling embodying a preferred form of the invention.

In Fig. 1 of the drawing there is generally indicated by the numeral 1 a socket member formed in two parts, the inner part 2 being internally threaded for the reception of an attaching bushing 3 of any suitable form, and the outer part 4 being threaded to the inner part as shown at 5.

A sealing member here shown in the form of a dished washer indicated generally at 6 is seated in the inner part 2 of the coupling socket against a shoulder 7 therein and is maintained in fluid-tight engagement with said shoulder by means of a spacing ring 8 bearing against a shoulder 9 in the interior of the outer socket member 4, and clamping the sealing member against the shoulder 7 when the parts of the socket are threaded together.

Figure 2:
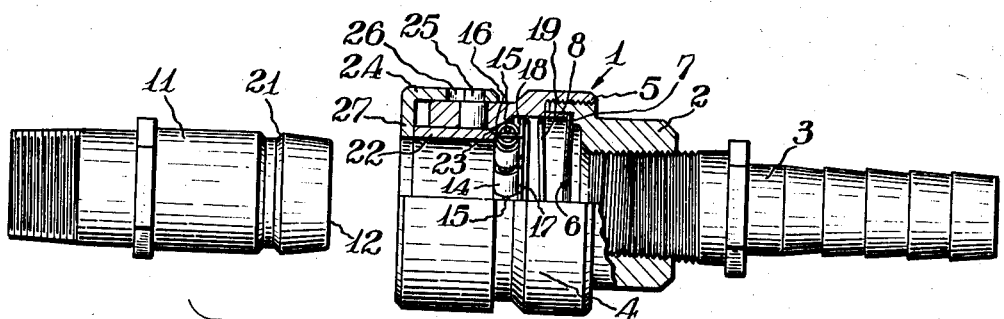
Fig. 2 is a similar view partly in elevation showing the parts of the coupling in disassembled relation.
Figure 3:
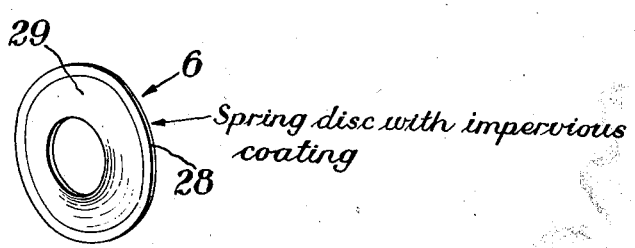
Fig. 3 is a detail in perspective of the flexible sealing element.

A nipple 11 is adapted to enter the socket 1 and is provided with a smooth terminal surface 12 arranged to engage the sealing member 6 adjacent its inner periphery. Means for detachably retaining the nipple 11 in the socket member is provided in the form of a contractible annular locking member 13 here shown in the form of a ring of cylindrical beads 14 (Fig. 2) strung loosely on a retaining wire 15. The locking annulus 13 is retained in the outer member 4 of the socket 1 adjacent an inwardly inclined surface 16 therein by means of an annular retainer 17 having fingers extending between the beads 14 and having a radial flange 18 arranged to be engaged by a compression spring 19 in the socket 1 and effective to urge the locking annulus 13 against the inclined surface 16 so as to cause the annulus to be constricted thereby.

A locking groove 21 is formed in the periphery of the nipple 11 in position to receive the annulus 13 when the nipple is inserted in the socket to such a depth that the end surface 12 of the nipple engages and compresses the sealing member 6.

Means for releasing the annulus from locking engagement in the groove 21 is provided in the form of a sleeve 22 slidably mounted in the outer end of the socket member 4 and provided with a bevelled surface 23 arranged to engage the annulus and lift it out of locking position. Means for manually actuating the releasing sleeve 22 is provided in the form of a thimble 24 slidably mounted on the exterior of the socket member 4 and retained thereon by suitable means such as a pin or rivet 25 seated in the socket member and engaging in a slot 26 in said thimble. The thimble 24 is provided with an inwardly extending flange 27 arranged to engage the protruding end of the releasing sleeve 22 whereby pressure applied to the thimble 24 in a direction to cause it to telescope with the coupling member moves the thimble 24 in the direction to release the locking annulus 13.

In accordance with the present invention, the sealing member 6 is formed as a composite disc comprising a base 28 of suitable elastic material such as stainless steel, and a sealing and protecting coating 29 of rubber or analogous material bonded to the steel base and arranged to engage the end surface 12 of the nipple 11 to seal the connection between the nipple and socket. When the fluid to be conveyed is of corrosive nature, it is preferable to have the coating 29 completely enclose and protect the base 28 as here illustrated. When the fluid is not injurious to the spring material, however, but, like hot oil for instance, merely tends to reduce the resiliency of the sealing material, it may be preferred to coat only the sealing surface of the member 6.

In the operation of this device, coupling of the nipple and socket is brought about merely by inserting the nipple in the socket until the locking ring 13 enters the groove 21 in the nipple. As the nipple enters the socket, the locking ring is forced back into the socket against the compression of spring 19, the inclined surface 16 of the socket thereby permitting the ring to expand to receive the nipple. When the nipple has been introduced in the socket to a position where the end surface 12 thereof has engaged firmly against the sealing member 6, the locking ring 13 is snapped into the groove 21 by the spring 19. Introduction of fluid under pressure through the coupling thereafter causes pressure against the rear of the sealing member 6 in a direction to cause an ejection of the nipple from the coupling. Any force tending to eject the nipple, however, merely causes the locking member 13 to be wedged more tightly into the groove 21 by the inclined surface 16 of the coupling.

When it is desired to remove the nipple, it is merely necessary for the operator to press the thimble 24 against the coupling, whereupon the flange 27 causes the releasing sleeve 22 to engage and lift the locking ring 13 out of the groove 21, whereupon the nipple 11 may be withdrawn.

The segregation of the functions of the sealing member 6 and the formation thereof as a composite member, the elements of which are particularly adapted for their individual functions, enables the production of a coupling capable of satisfactory operation under conditions heretofore impossible to satisfy in a commercially practical device. Thus, couplings used to convey lubricant to the various tools of automatic machinery must be adapted to convey hot oil or cutting compound over long periods of use without deterioration. When rubber or rubber substitutes have hitherto been used for sealing purposes, it has been found that the sealing member swells and loses its elasticity in a comparatively short time so as to render the coupling commercially unsatisfactory.

In the present device, the steel backing 28 of the sealing member 6 retains its elasticity indefinitely, whereas the coating of rubber or rubber substitute is so thin that swelling and softening thereof is of no significance, whereas its sealing effect is not impaired but may even be improved. It has been found that couplings of this character are capable of entirely satisfactory performance over long periods of use in connection with fluids which have heretofore caused rapid deterioration and necessitated frequent replacement of coupling elements.

Although but one form of the invention has been shown and described in detail, it will be understood that other embodiments are possible and various changes may be made in the proportions and arrangements of the parts without departing from the spirit of the invention as defined in the claim appended hereto.

What is claimed is:

In a hose coupling for fluids having a degenerative effect on elastic sealing compounds, including a nipple having an annular sealing surface, a shouldered socket adapted to receive the nipple and detachable means to retain the nipple in the socket, means for sealing between said nipple and said socket comprising a composite annular sealing member consisting of a base of elastic sheet metal and a layer of elastically deformable sealing compound bonded to opposite sides of the base, and means associated with the socket including an annulus for clamping the rim of the sealing member against the shoulder in such position that the nipple engages the inner periphery of the sealing member for fluid tight sealing engagement therewith.

FRANK T. CHRISTIAN.